July 15, 1958   P. N. STOYNICH   2,843,328
FOOD WASTE DISPOSER
Filed May 31, 1956   2 Sheets-Sheet 1
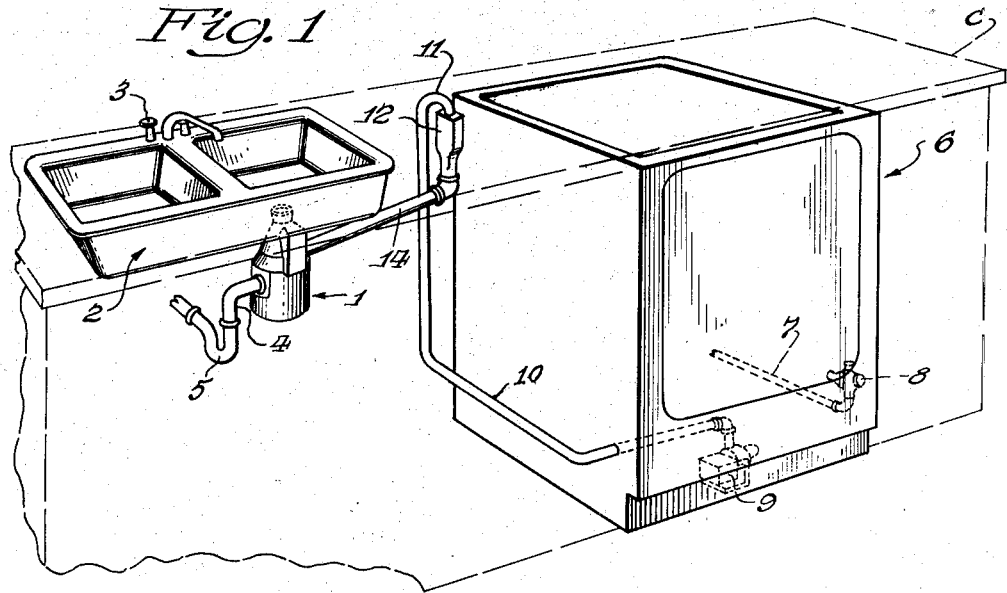
Fig. 1
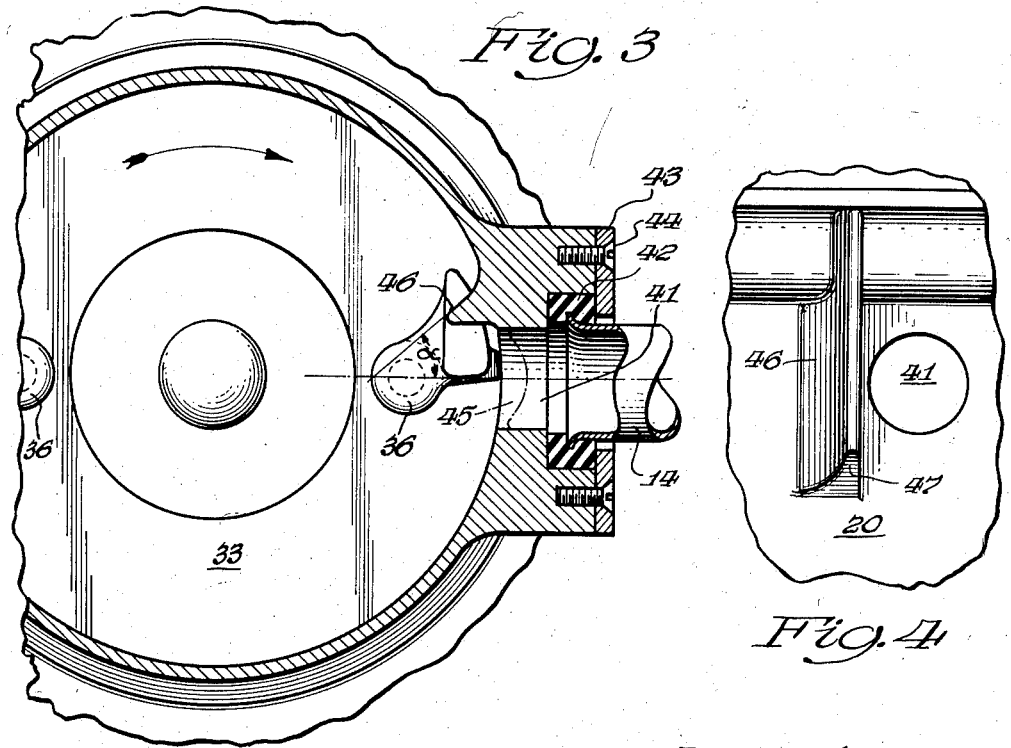
Fig. 3
Fig. 4
Inventor
Peter N. Stoynich
By Andrew G. Hubbard
Attorney

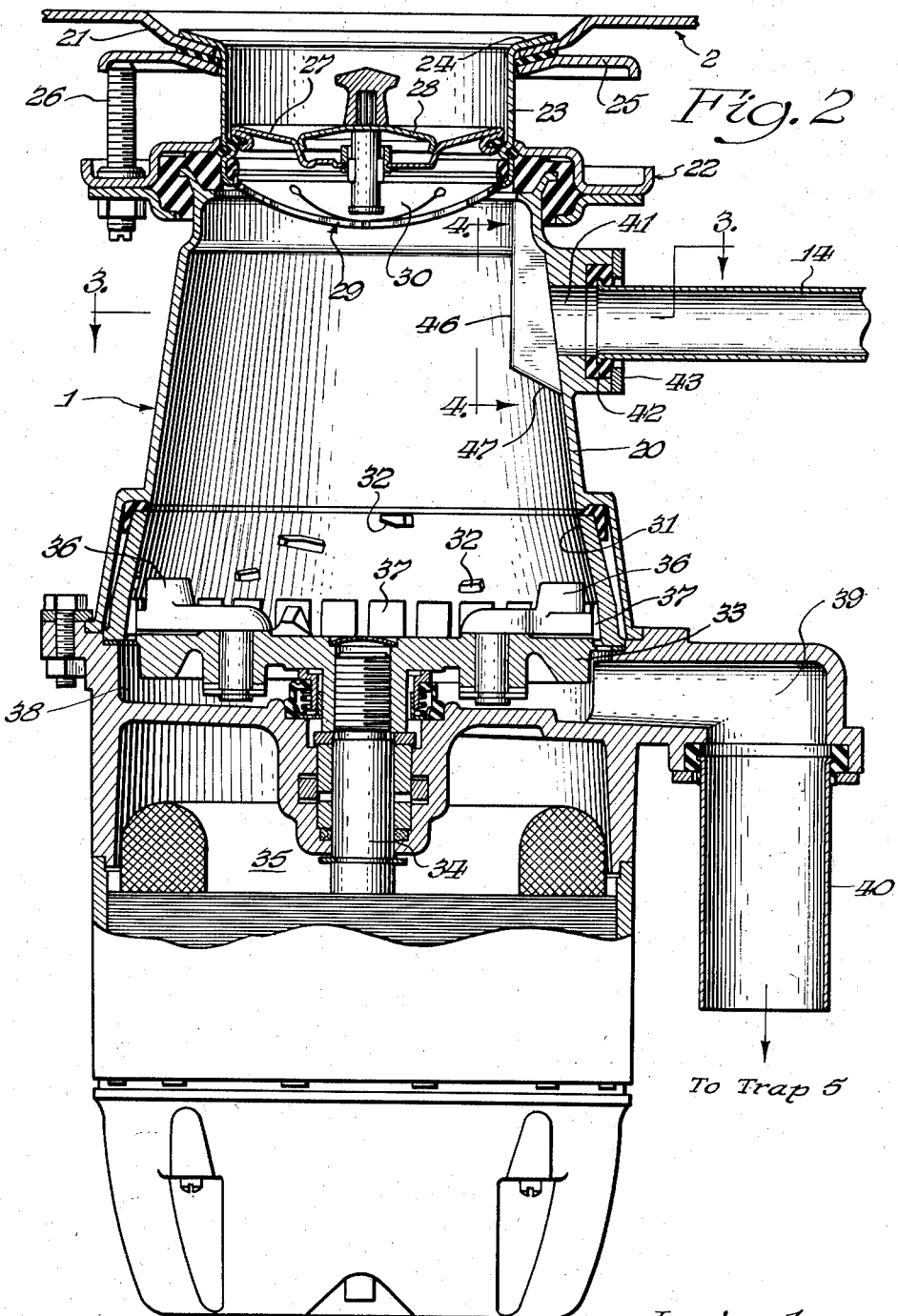

United States Patent Office 2,843,328
Patented July 15, 1958

2,843,328

FOOD WASTE DISPOSER

Peter N. Stoynich, Chicago, Ill., assignor to General Electric Company, a corporation of New York Application May 31, 1956, Serial No. 588,392

5 Claims. (Cl. 241—46)

This invention relates to food waste disposers, and, in particular, to food waste disposers in which the comminution chamber is adapted to receive effluent from an adjacent water-using device such as a dishwasher or the like.

Food waste disposers of the domestic type, for example, comprise a motor-driven comminution mechanism having a comminution chamber affixed to the drainage opening of the kitchen sink and arranged to receive waste material for comminution by a rapidly rotating mechanism housed in the lower portion of the chamber. The comminution is effected in the presence of a continuous flow of cold water from the kitchen sink, and the mixture of finely ground waste and water is forcibly discharged from the chamber into the plumbing waste line of the building. The comminution chamber also receives normal sink drainage entering from the sink and passing through the discharge portion of the disposer to the plumbing waste line of the building, as is well understood.

It is becoming popular to adapt the comminution chamber of the disposer for the reception of a waste or effluent line from dishwasher or similar water-using appliance disposed in suitable proximity to the waste disposal apparatus. This is obviously advantageous in that the disposer is already connected to the plumbing waste piping and is adapted to handle normal kitchen sink drainage; whereupon the drainage or discharge from the dishwasher, being predominately water, can be connected to the plumbing waste piping by way of the food waste disposer and thus eliminate the necessity of making a separate connection from the dishwasher to said piping. A dishwasher so associated with the disposer is equipped with a discharge pump which drives the effluent through piping terminating in a downwardly directed discharge port disposed above the maximum overflow spill level of the dishwasher, and disposed also at least one inch above an open-topped receptacle comprising the inlet of a pipe or conduit entering the disposer comminution chamber through the upper portion of the side wall thereof. The one inch air gap through which the dishwasher effluent must fall normally prevents any possibility of back-flow of liquid from the disposer to the dishwasher.

A very large majority of food waste disposers installed in domestic kitchens are manually controlled; that is to say, the motor which operates the comminution mechanism may be controlled by a simple wall switch or by a switch associated with a stopper element disposed in the entrance throat of the disposer comminution chamber and manually operated to a position which closes the motor circuit switch. If the user stops the waste disposer operation before all of the waste material is evacuated therefrom, or if quantities of corn husks or other difficultly comminutable materials are placed in the disposer, food waste may accumulate to the point of blocking the passage of water to the plumbing waste piping. Not realizing that the stoppage exists, the user may place additional waste in the disposer, turn on the water and the disposer, and leave the room or become preoccupied with other tasks. The water quickly fills the comparatively small capacity comminution chamber. The rapidly rotating comminution mechanism creates a powerful centrifugal pumping action. In installations in which a dishwasher discharge line is connected to the disposer chamber, this pumping action will drive the liquid content of the disposer chamber back through the dishwasher effluent piping from which it will gush with substantial force at the above described air gap. The flow through the effluent piping has been known to be of such force that it actually jumps across the air gap and enters the dishwasher itself. Obviously, the potentialities for damage are great.

It may appear obvious to prevent such an occurrence by placing a check valve in the dishwasher effluent piping adjacent the point of connection thereof with the disposer chamber. A check valve is not looked upon with favor by plumbing inspectors, for it may become clogged or jammed by the food soil and/or grease content of the dishwasher effluent and may, therefore, fail to function at a critical time. I have found that complete protection is obtainable by constructing the comminution chamber in such manner that even under the most extreme conditions, the operation of the comminution element will not only not produce a flow of liquid from the chamber into the dishwasher effluent piping but actually produce a negative pressure in the piping so as quickly to evacuate any liquid which was present in the piping. In a presently preferred embodiment, this advantageous result is obtained by providing the wall of the comminution chamber with an integral baffle disposed upstream of the point of connection of the dishwasher piping with the comminution chamber, and so relating the shape and other physical characteristics of the baffle to the chamber and to the size and disposition of the opening into the chamber as to cause the movement of water in the chamber to produce the aforementioned negative pressure.

It is, therefore, an object of the invention to provide an improved food waste disposer.

It is another object of the invention to provide a food waste disposer having means whereby the effluent piping from a dishwasher or the like may be connected to the comminution chamber of the food waste disposer without danger of discharge of liquid from the comminution chamber into the dishwasher piping.

It is a further object of the invention to provide means for preventing the discharge of liquid under pressure from the comminution chamber of a food waste disposer into piping connected thereto.

Other features and advantages of the invention will be apparent from the following detailed description of a presently preferred embodiment, read in connection with the accompanying drawings in which:

Fig. 1 is a somewhat schematic perspective showing a kitchen sink having a food waste disposer attached thereto, and showing the discharge piping from a dishwasher arranged for discharge into the disposer;

Fig. 2 is a side sectional elevation of a typical food waste disposer embodying a presently preferred form of the invention herein;

Fig. 3 is a plan section taken on the lines 3—3 of Fig. 2; and

Fig. 4 is a fragmentary vertical elevation of the comminution chamber of the disposer looking in the direction of the arrows 4—4 of Fig. 2.

Fig. 1 shows somewhat schematically an installation of a conventional automatic electric dishwasher having means whereby the effluent from the dishwasher is discharged into the comminution chamber of a food waste disposer, from which it passes to the plumbing drain. As shown, the food waste disposer 1 is affixed to a basin of a kitchen sink 2. Said sink is provided with any convenient form of hot water and cold water faucets 3. The food waste disposer is affixed by means, later described, to the drainage opening of the sink basin and is equipped with discharge means 4 connected to the plumbing trap 5 which discharges into a building plumbing waste line (not shown) as now well understood in the art. The dishwasher 6 is in all respects conventional. Of its mechanisms, I have shown only the piping 7 serving the automatic valve 8 which supplies water to the dishwasher to effect the several washing and rinsing operations, and the discharge pump 9 which receives the effluent of the dishwasher and sends it through the discharge piping 10 to a point where the gooseneck 11 empties into the open top receptacle 12 across an air gap of at least one inch. The receptacle 12 is in open communication with a pipe 14 which enters the comminution chamber of the disposer, as presently explained. The dishwasher is illustrated as being installed within a kitchen counter C, and with the exception of the gooseneck 11 and the upper portion of receptacle 12, the above described piping is within the cabinet below the top thereof.

Referring now to Fig. 2, the food waste disposer 1 comprises a comminution chamber 20 of generally frusto-conical shape and having an open top which is mounted in registry with the drainage opening rim 21 of the sink 2. For example, such mounting may comprise the resiliently affixed ring 22, the collar 23 attached thereto and having the flange 24 engaging the margin of the drainage opening 21, and the clamping ring 25 disposed on the underside of the sink drainage opening and provided with a gasket or the like. A plurality of bolts 26 fixed to the ring 22 are arranged to bear against the clamping ring to secure the disposer to the sink, as is now well understood. Normal access to the interior of the chamber 20 is by way of the collar 23. A removable stopper 27 serves the dual function of a sink stopper for blocking off flow of water into the chamber 20 when desired (said stopper being in such position in Fig. 2) or permitting flow of water from the sink into the disposer when the central valve portion 28 is lifted and latched in raised position. A rubber splash guard 29 having a plurality of flexible angular sectors 30 is ordinarily used in food waste disposers. When the stopper 27 is removed, the food waste (not shown) is pushed through the splash guard, the flexible sectors 30 of which readily separate in a downward direction to permit the passage of the pieces of waste. The splash guard permits the flow of water from the sink into the chamber 20. Frequently the disposer may be operated without the stopper 27 in place and the guard 29 prevents water from splashing out of the chamber and protects against the possibility of waste particles being propelled out of the chamber.

The comminution of the food waste is effected by the combination of a shredding element 31, usually a ring-shaped member fitted to the chamber near the bottom thereof and having various projections 32, and a rotating flywheel 33 which forms the base of the chamber 20. Said flywheel is fixed to the end of the shaft 34 of a motor 35. The motor is usually of the 4-pole type having a maximum speed of the order of 1750 R. P. M. when energized by 60 cycle alternating current and it will thus be seen that the flywheel rotates very rapidly even when the chamber 20 is loaded with waste. The operation of the motor may be controlled by any suitable means such as a single pole, single throw, wall-mounted switch (not shown).

The flywheel may have fixed impeller elements, or the vertically pivoted hammer-type 36 shown in Fig. 2. Both the fixed and the hammer-type are well known in the art. They serve to enforce a rotating and tumbling movement of the waste material in the chamber and bring the material against the projections 32 and against the cutting edges of the passages 37 which serve to conduct the mixture of ground waste and water from the chamber 20 to the outlet chamber 38 from which it passes through a suitable discharge fitting 39 and tail pipe 40 to the plumbing trap 5.

The food waste disposer above described is common in the art and forms no part of the present invention.

The dishwasher effluent pipe 14 connects to a passage 41 formed by a suitable cylindrical boss extending from the side of the chamber 20 near the top thereof. By any suitable means, such as the gasket 42 maintained under compression by the cover plate 43 and fasteners 44, a liquid tight connection is established between the pipe 14 and the passage 41. A feature of the comminution chamber illustrated here is the fact that the base of the cylindrical boss is formed as a knockout 45 (Fig. 3). When the disposer is not intended to receive dishwasher effluent, the knockout 45 remains in place as a solid wall portion of the chamber 20. When the effluent pipe 14 is to be connected to the chamber 20 for the passage of dishwasher waste into the chamber, the knockout 45 is "knocked out" with a suitable tool to complete the passage into the chamber.

As previously stated, there are times when, because of the accumulation of waste material about the openings 37 in the base of chamber 20, or perhaps a partial stoppage in the trap 5, free drainage from the disposer and into the plumbing waste line of the building is retarded. With the disposer in operation, the powerful action of the flywheel impellers 36, sets up pumping forces which are ordinarily able to clear the partial stoppage in a very short time, whereupon there is no further accumulation of waste in the disposer chamber. Experience has shown, however, that there are times when the comminution chamber 20 becomes completely flooded with water, and if at such times the user operates the disposer, thinking to cure the temporary stoppage by the pumping action of the disposer, it will be obvious that liquid could be discharged from the chamber back through the piping 14 and spew out of the open topped receptacle 12.

To prevent liquid from being pumped from the chamber 20 through the pipe 14 under even the worst possible conditions, I have formed a baffle 46 as an integral part of the wall of the chamber 20. In the present illustration, it is assumed that the flywheel will rotate in a clockwise direction, whereupon the water content of the chamber 20 will swirl about the wall of the chamber in the same direction. Thus, as shown in Figs. 2 and 3, the baffle 46 is disposed on the upstream side of the passage 41. The baffle 46 completely traverses the passage 41 in that it commences well above the passage and extends to a point below the passage. I have found that its radially innermost edge portion should be substantially vertical and quite thin. The baffle should have a minimum radial projection into the chamber of approximately one-half of the diameter of the passage 41. A line tangent to the baffle at its extremity should make an angle alpha of not greatly more than, and preferably less than, 45 degrees with the axis of the passage 41. Expressed differently, I have found that the tangent line should establish a chord which subtends less than one-half, but more than one-quarter of the chamber circumference. Such a relationship produces an action in which the water flow passes in front of the passage 41 at high speed and in a space relation at least equal to the diameter of the passage.

Not only does this structural relationship of the baffle 46 to the chamber 20 and the passage 41 prevent any pumping of liquid into the passage, but the speed and angular relation of water flow to the axis of the passage creates a negative pressure in the pipe 14, thereby quickly emptying the pipe 14 of any liquid therein.

The position of the baffle 46 is well above the comminution ring 31 and is, therefore, out of the normal active zone of the disposer. It will be noted that the slope of the upstream face of the baffle 46 and the slope of the bottom surface 47 thereof provides for the deflection of long, hard waste material, such as bones, corn cobs, or the like and, therefore, completely eliminates the possibility of such articles from being jammed between the rotating impeller elements and the baffle.

While there has been described what is at present considered to be the preferred embodiment of the invention, it will be understood that various modifications may be made therein, and it is intended to cover in the appended claims all such modifications as fall within the scope of the invention.

I claim:

1. A food waste disposer, comprising structure providing a vertical frusto-conical comminution chamber having a principal opening at the top thereof through which to receive waste and a flow of water, a comminution element forming a base for said chamber, said element being rotatable on a vertical axis concentric with said chamber, means for rotating said comminution element at high speed whereby said comminution element will propel the fluid content of said chamber about the wall thereof by centrifugal action, a substantially horizontally disposed conduit communicating with an opening in said chamber wall for the admission of air and water into said chamber, and a rigid baffle member disposed wholly within said chamber and wholly above said rotatable comminution element to intercept said rotating liquid upstream of said chamber wall opening, said baffle having a thin edge portion extending axially of said chamber and traversing the full diameter of said side wall opening, the upstream face of said baffle adjacent the edge portion thereof making an acute angle relative to the axis of said conduit.

2. A food waste disposer, comprising structure providing a vertical frusto-conical comminution chamber having a principal opening at the top thereof through which to receive waste and a flow of water, a comminution element forming a base for said chamber, said element being rotatable on a vertical axis concentric with said chamber, means for rotating said comminution element at high speed whereby said comminution element will propel the fluid content of said chamber about the wall thereof by centrifugal action, a substantially horizontally disposed conduit communicating with an opening in said chamber wall for the admission of air and water into said chamber, and a rigid baffle member disposed in vertical spaced relation to said comminution element and projecting radially inwardly of said chamber to intercept said rotating liquid upstream of said chamber wall opening, the upstream face of said baffle, considered with respect to the direction of rotation of said fluid content, being concave and tapering to a thin edge portion extending axially of said chamber and traversing the full diameter of said side wall opening to deflect said liquid inwardly of said chamber wall at an acute angle relation to the axis of said conduit, and the bottom wall of said baffle sloping upwardly and inwardly relative to said chamber wall.

3. A food waste disposer, comprising structure providing a frusto-conical comminution chamber having a top opening through which to receive waste and a flow of water, a comminution element disposed within said chamber adjacent the bottom thereof and being rotatable on a vertical axis, means for rotating said element at high speed, whereby a mixture of waste and water is propelled by centrifugal action in a circular path about the inside wall of said chamber, means providing an opening in a wall of said chamber near the top of said chamber for the admission of liquid thereinto, a conduit communicating with said opening, and an axially extending baffle projecting from said chamber wall immediately upstream of said wall opening, considered in respect to the direction of movement of said waste and water mixture during rotation of said comminuting element, said baffle extending from the top of said chamber to below the said side wall opening and having a thickness, measured radially of said chamber and throughout an axial distance traversing said opening, approximately equal to one-half the diameter of said opening; the upstream face of said baffle sloping sharply outwardly from said chamber wall to intercept liquid flowing about said wall and effect its flow toward the center of said chamber in a path intercepting the axis of said conduit at an angle not substantially greater than forty-five degrees, whereby the movement of said liquid relative to the axis of said wall opening induces a negative pressure in said conduit; said baffle terminating substantially above the comminution element and having a bottom wall sloping upwardly toward the center of said chamber.

4. A food waste disposer, comprising structure providing an open topped frusto-conical comminution chamber having a principal opening through which to receive waste and a flow of water, a comminution element forming a base for said chamber, said element being rotatable on a vertical axis, means for rotating said comminution element at high speed, whereby a mixture of waste and water is propelled by centrifugal action in a circular path about the inside wall of said comminution chamber, means providing an opening in the side wall of said comminution chamber near the top of said chamber for the admission of air and water thereinto, and an axially extending baffle member projecting from said chamber wall immediately in advance of said side wall opening, considered in respect to the direction of rotation of said waste and water mixture during rotation of said comminution element, said baffle having a radial dimension equal substantially to the radius of said wall opening and completely traversing said opening; the upstream surface of said baffle curving concavely from said chamber wall to a radially innermost end of said baffle at which a line of tangency thereto comprises a chord which subtends at least one-quarter but substantially less than one-half of the circumference of said chamber, whereby when said comminution element is rotating at operational speed, said upstream surface intercepts said rotating mixture of waste and water in advance of said opening and directs it inwardly of said chamber in a line which intersects the axis of said opening at an acute angle, the vertex of which is remote from the said comminution chamber wall.

5. In combination, a food waste disposer comprising structure providing a vertical substantially frusto-conical chamber arranged to receive waste and a flow of water through an opening in the top thereof, said chamber having comminution devices projecting inwardly of said chamber about a lower side wall portion thereof, a horizontally disposed flywheel at the base of said chamber, said flywheel being rotatable on a vertical axis concentric with said chamber and having impeller elements disposed adjacent said comminution devices, a dishwashing apparatus adjacent said disposer, a discharge conduit for said dishwashing apparatus continuously openly communicating with said disposer chamber through an entry port in the side wall of said chamber near the top thereof, means for rotating said flywheel at high speed to cause the said impeller elements to propel a mixture of waste and water about the side wall of said chamber by centrifugal action, a rigid baffle member projecting into said chamber from said side wall to intercept said rotating mass of waste and water immediately upstream of said entry port, said baffle having a thin edge portion extending axially of said chamber and traversing the full diameter of said entry port, the upstream face of said baffle making an acute angle relative to the axis of said discharge conduit for direction of the said rotating mass inwardly of said chamber along a line of movement which defines a chord which subtends at least one-quarter but substantially less than one-half of the circumference of said chamber, whereby to maintain the said entry port continuously open for the admission of effluent from said dishwasher, and drainage means common to the disposer and dishwasher for conducting the contents of said chamber to a plumbing waste system.

References Cited in the file of this patent

UNITED STATES PATENTS

| | | |
|---|---|---|
| 1,177,989 | Bullock | Apr. 4, 1916 |
| 2,547,708 | Kreiner | Apr. 3, 1951 |